(12) United States Patent
Chen et al.

(10) Patent No.: US 11,363,696 B2
(45) Date of Patent: Jun. 14, 2022

(54) OVER-TEMPERATURE PROTECTION CIRCUIT OF AN LED DRIVING POWER SUPPLY

(71) Applicant: SHENZHEN SOSEN ELECTRONICS CO., LTD, Guangdong (CN)

(72) Inventors: Jiansheng Chen, Guangdong (CN); Ping Dai, Guangdong (CN); Chaoyang Zou, Guangdong (CN)

(73) Assignee: SHENZHEN SOSEN ELECTRONICS CO., LTD, Shenzhen (CN)

( * ) Notice: Subject to any disclaimer, the term of this patent is extended or adjusted under 35 U.S.C. 154(b) by 0 days.

(21) Appl. No.: 17/290,265

(22) PCT Filed: Apr. 1, 2019

(86) PCT No.: PCT/CN2019/080863
§ 371 (c)(1),
(2) Date: Apr. 30, 2021

(87) PCT Pub. No.: WO2020/098201
PCT Pub. Date: May 22, 2020

(65) Prior Publication Data
US 2022/0039238 A1 Feb. 3, 2022

(30) Foreign Application Priority Data
Nov. 14, 2018 (CN) .......................... 201821876068.6

(51) Int. Cl.
*H05B 45/30* (2020.01)
*H05B 45/56* (2020.01)

(52) U.S. Cl.
CPC ............. *H05B 45/56* (2020.01); *H05B 45/30* (2020.01)

(58) Field of Classification Search
CPC ........ H05B 45/00; H05B 45/30; H05B 45/18; H05B 45/28; H05B 45/40; H05B 45/48; H05B 45/56
See application file for complete search history.

(56) References Cited

U.S. PATENT DOCUMENTS

| 10,021,756 | B2* | 7/2018 | Bradford | ................ H05B 45/58 |
| 2012/0032612 | A1* | 2/2012 | Antony | .................. H05B 45/56 |
| | | | | 315/297 |

(Continued)

*Primary Examiner* — Thai Pham

(57) ABSTRACT

The application relates to an over-temperature protection circuit of an LED driving power supply. The over-temperature protection circuit comprises a temperature detection circuit for sensing a temperature change; a switch control circuit connected to the output end of the temperature detection circuit and controlling the on-off of the circuit according to the output signal of the temperature detection circuit; a shunt circuit connected to an output end of the switch control circuit and shunting current when the switch control circuit is in an on state; a current detection circuit connected to an output end of the shunt circuit and changing a current detection signal according to an output current of the shunt circuit; the output end of the current detection circuit is connected with the feedback loop. The application has the advantages of low cost, stable performance, little environmental influence and high precision.

20 Claims, 1 Drawing Sheet

(56) References Cited

U.S. PATENT DOCUMENTS

| | | | |
|---|---|---|---|
| 2012/0062120 A1* | 3/2012 | Riesebosch | H05B 45/56 315/117 |
| 2012/0236456 A1* | 9/2012 | Yu | H05B 47/28 361/91.1 |
| 2016/0360582 A1* | 12/2016 | Kato | H02M 3/156 |

* cited by examiner

OVER-TEMPERATURE PROTECTION CIRCUIT OF AN LED DRIVING POWER SUPPLY

BACKGROUND OF THE APPLICATION

1. Technical Field

The application relates to the field of LED driving power, in particular to an over-temperature protection circuit of an LED driving power supply.

2. Description of Related Art

With the energy saving and emission reduction, green lighting is popular, compared with traditional lighting such as incandescent lamp and fluorescent lamp, LED lighting has been more and more widely used because of its obvious characteristics of energy saving, high efficiency, environmental protection, longer life, better color rendering and so on, and it is also recognized as the most promising high-tech field in the 21st century. And LED as no strobe, no ultraviolet radiation, no electromagnetic radiation, lower thermal radiation, etc. coupled with the application of optical diffusion technology to eliminate glare, making it the first choice for lighting. In large-scale applications, there are often problems such as short power supply life and lack of reliability, leading to the advantages of LED lighting cannot be fully demonstrated, so the key to large-scale application of LED lighting is the high reliability of the drive power. LED driving power is the core of LED lighting, its life directly affects the life of LED lighting.

The key to influence the service life of the power supply is temperature, and the single chip is used for realizing over temperature protection in the prior art, so that the use cost is high and the requirement on the use environment is high. In addition, the LED driving over-temperature protection circuit in the prior art does not have return difference compensation, so that the lamp flashes at the over-temperature protection point.

BRIEF SUMMARY OF THE APPLICATION

The technical problem to be solved by the application is to provide an over-temperature protection circuit of an LED driving power supply aiming at the defects of the prior art that the over temperature protection cost is high and the flashover is caused by an over temperature protection point.

The technical scheme adopted by the application to solve the technical problems is as follows: an over-temperature protection circuit of an LED driving power supply is constructed, which comprises a temperature detection circuit (100) for sensing temperature change;

A switch control circuit (200) connected with the output end of the temperature detection circuit (100) and controlling the on-off of the circuit according to the output signal of the temperature detection circuit (100);

A shunt circuit (300) connected to an output end of the switch control circuit (200) and shunting current when the switch control circuit (200) is in an on state;

A current detection circuit (400) connected to an output end of the shunt circuit (300) and changing a current detection signal according to an output current of the shunt circuit (300); The output end of the current detection circuit (400) is connected with a feedback loop (500).

Furthermore, in the over-temperature protection circuit of an LED driving power supply of the application, the temperature detection circuit (100) comprises an operational amplifier U1-A, a thermistor R12, a signal source, and a peripheral circuit;

The non-inverting input end of the operational amplifier U1-A is connected with the signal source through the thermistor R12, and the inverting input end of the operational amplifier U1-A is connected with the signal source; and that operational amplify U1-A is connected with the peripheral circuit.

Furthermore, in the over-temperature protection circuit of an LED driving power supply of the application, the peripheral circuit comprises a resistor R10, a resistor R11, a resistor R13 and a resistor R14;

The non-inverting input end of the operational amplifier U1-A is connected with the output end of the operational amplifier U1-A through the resistor R10, the non-inverting input end of the operating amplifier U1-A is connected with the ground through the resistor R11, and the inverting input end of the operating amplifier U1-A is connected with the signal source through the resistor R13;

The inverting input end of the operational amplifier U1-A is connected with the switch control circuit (200) through the resistor R14, and the output end of the operational amplifier U1-A is connected with the switch control circuit (200).

Furthermore, in the over-temperature protection circuit of an LED driving power supply of the application, the switch control circuit (200) comprises a triode Q1, a resistor R1, and a resistor R2;

A base electrode of the triode Q1 is connected with an output end of the operational amplifier U1-A through the resistor R1, a base electrode of the triode Q1 is connected with an emitter electrode of the diode Q1 through the resistor R2, and an emitter electrode of the diode Q1 is connected with the inverting input end of the operational amplifier U1-A through the resistor R14; The emitter of the triode Q1 is grounded;

The collector of the triode Q1 and the emitter of the triode Q1 are connected with the shunt circuit (300).

Furthermore, in the over-temperature protection circuit of an LED driving power supply of the application, the shunt circuit (300) comprises a resistor R3 and a resistor R4;

The collector of the triode Q1 is connected with the current detection circuit (400) through the resistor R3, and the emitter of the triode Q1 is connected with the current detection circuit (400) through the resistor R4.

Furthermore, in the over-temperature protection circuit of an LED driving power supply of the application, the current detection circuit (400) comprises an operational amplifier U1-B;

The non-inverting input end of the operational amplifier U1-B is connected with the collector of the triode Q1 through the resistor R3, and the non-inverting input end of the operational amplifier U1-B is connected with the emitter of the triode Q1 through the resistor R4;

The inverting input end of the operational amplifier U1-B is connected with the current detection signal output end; the output end of the operational amplifier U1-B is connected with the feedback loop (500).

Furthermore, in the over-temperature protection circuit of an LED driving power supply of the application, the current detection circuit (400) further comprises a resistor R5;

The non-inverting input end of the operational amplifier U1-B is connected with the signal source through the resistor R5.

Furthermore, in the over-temperature protection circuit of an LED driving power supply of the application, the current detection circuit (400) further comprises a resistor R7;

The output end of the operational amplifier U1-B is connected to the feedback loop (500) through the resistor R7.

Furthermore, in the over-temperature protection circuit of an LED driving power supply of the application, the signal source is a 2.5V signal source.

Furthermore, in the over-temperature protection circuit of an LED driving power supply of the application, the thermistor R12 is a negative temperature coefficient thermistor.

The over-temperature protection circuit of an LED driving power supply has the following advantages that: The over-temperature protection circuit comprises a temperature detection circuit used for sensing temperature change, a switch control circuit connected with the output end of the temperature detection circuit and used for controlling the on-off of the circuit according to an output signal of the temperature detection circuit, a shunt circuit connected with the output end of the switch control circuit and used for shunting current when the switch control circuit is in an on-state; And the output end of the current detection circuit is connected with a feedback loop. The application uses a pure analog circuit of the operational amplifier and the sensor, has the advantages of low cost, stable performance, little environmental influence and high precision, and can automatically reduce the output power to protect the LED driving power supply when the temperature is too high.

BRIEF DESCRIPTION OF THE SEVERAL VIEWS OF THE DRAWINGS

In the following, the application will be further described with reference to the attached drawings and embodiments. In the figures.

DETAILED DESCRIPTION OF THE APPLICATION

In order to have a clearer understanding of the technical features, purposes and effects of the application, specific embodiments of the application is described in detail with reference to the accompanying drawings.

Embodiment 1

Figure 1:
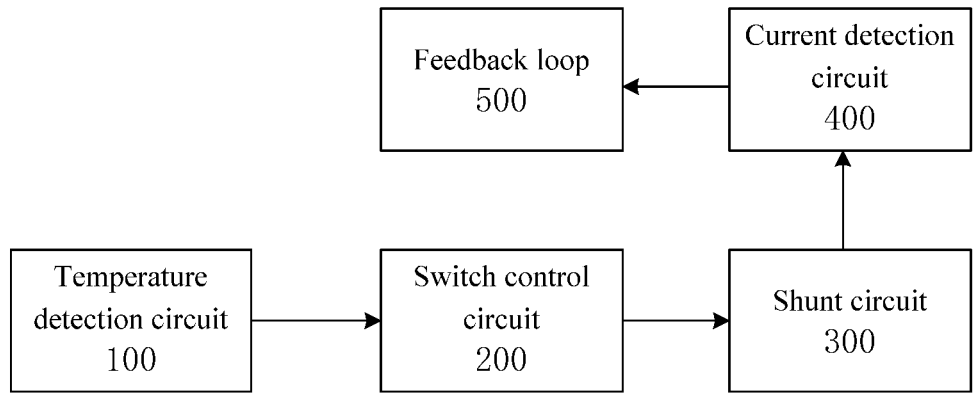
FIG. 1 is a structural schematic diagram of an over-temperature protection circuit of an LED driving power supply according to a first embodiment of the application.

Referring to FIG. 1, the technical scheme adopted by the embodiment to solve the technical problem is as follows: an over-temperature protection circuit of an LED driving power supply is constructed, which comprises a temperature detection circuit 100 for sensing temperature change;

A switch control circuit 200 connected to the output end of the temperature detection circuit 100 and controlling the circuit to be on or off according to the output signal of the temperature detection circuit 100;

A shunt circuit 300 connected to an output end of the switch control circuit 200 and shunting a current when the switch control circuit 200 is in an on state;

A current detection circuit 400 connected to an output end of the shunt circuit 300 and changing a current detection signal according to an output current of the shunt circuit 300; the output of the current sense circuit 400 is connected to a feedback loop 500.

Embodiment 2

Figure 2:
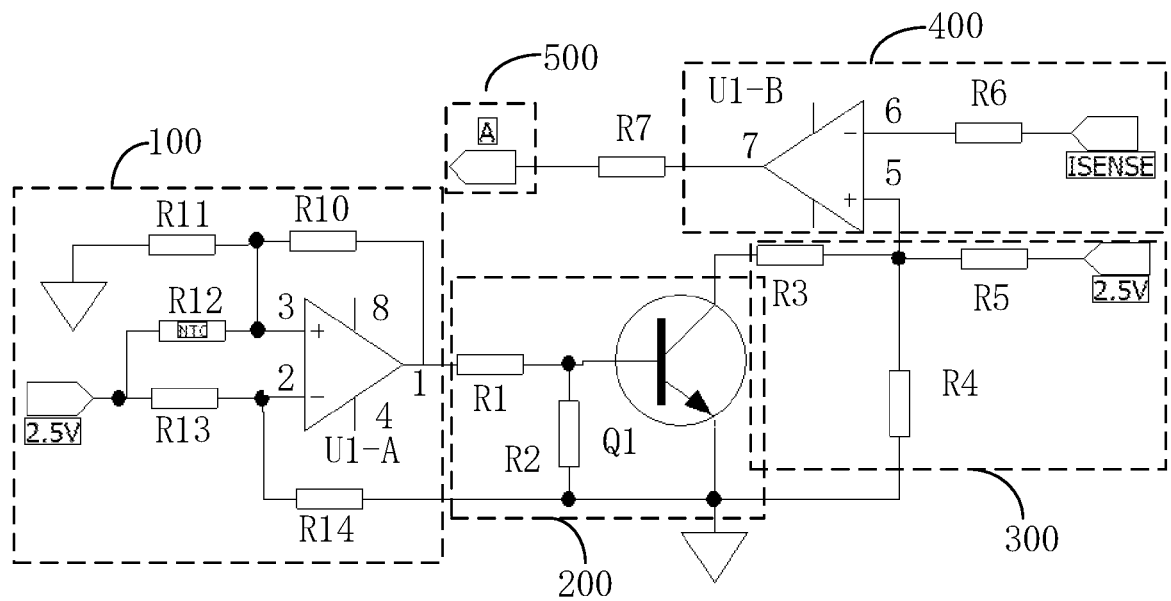
FIG. 2 is a schematic circuit diagram of the second embodiment of the over-temperature protection circuit of an LED driving power supply of the application.

Referring to FIG. 2, in the over-temperature protection circuit of an LED driving power supply of this embodiment, the temperature detection circuit 100 includes an operational amplifier U1-A, a thermistor R12, a signal source, and a peripheral circuit. Preferably, the signal source is a 2.5V signal source. Preferably, the thermistor R12 is a negative temperature coefficient thermistor.

The non-inverting input end of the operational amplifier U1-A is connected with a signal source through a thermistor R12, and the inverting input end of the operational amplifier U1-A is connected with the signal source; And that operational amplify U1-A is connected with the peripheral circuit.

Further, in the over-temperature protection circuit of an LED driving power supply of this embodiment, the peripheral circuit includes a resistor R10, a resistor R11, a resistor R13 and a resistor R14; The non-inverting input end of the operational amplifier U1-A is connected with the output end of the operational amplifier U1-A through the resistor R10, the non-inverting input end of the operating amplifier U1 is connected with the ground through the resistor R11, and the inverting input end of the operating amplifier U1 is connected with a signal source through the resistor R13; The inverting input end of the operational amplifier U1-A is connected with the switch control circuit 200 through the resistor R14, and the output end of the operational amplifier U1-A is connected with the switch control circuit 200.

Furthermore, in the over-temperature protection circuit of an LED driving power supply of this embodiment, the switch control circuit 200 includes a triode Q1, a resistor R1, and a resistor R2; A base electrode of the triode Q1 is connected with an output end of the operational amplifier U1-A through the resistor R1, a base electrode of the triode Q1 is connected with an emitter electrode of the triode Q1 through the resistor R2, and an emitter electrode is connected with a inverting input end of the operational amplifier U1-A through the resistor R14; The emitter of the triode Q1 is grounded; The collector of the triode Q1 and the emitter of the triode Q1 are connected to the shunt circuit 300.

Further, in the over-temperature protection circuit of an LED driving power supply of this embodiment, the shunt circuit 300 includes a resistor R3 and a resistor R4; the collector of the triode Q1 is connected to the current detection circuit 400 through the resistor R3, and the emitter of the triode Q1 is connected to the current detection circuit 400 through the resistor R4.

Further, in the over-temperature protection circuit of an LED driving power supply of this embodiment, the current detection circuit 400 includes an operational amplifier U1-B; The non-inverting input end of the operational amplifier U1-B is connected with the collector of the triode Q1 through the resistor R3, and the non-inverting input end of the operational amplifier U1-B is connected with the emitter of the triode Q1 through the resistor R4; The inverting input end of the operational amplifier U1-B is connected with the output end of the current detection signal; the output of the operational amplifier U1-B is connected to a feedback loop 500.

Further, in the over-temperature protection circuit of an LED driving power supply of this embodiment, the current detection circuit 400 further includes a resistor R5; the non-inverting input of operational amplifier U1-B is connected to the signal source through the resistor R5.

Further, in the over-temperature protection circuit of an LED driving power supply of this embodiment, the current detection circuit 400 further includes a resistor R7; the output of operational amplifier U1-B is connected to feedback loop 500 through the resistor R7.

As shown in FIG. 2, by controlling the current loop, the current is changed to half of the normal current when the temperature is over, so as to achieve the purpose of automatically reducing half power. The specific implementation process is as follows:

The operational amplifier U1-A and the peripheral circuit constitute the hysteresis generation part of the present scheme, which includes a resistor R11, a resistor R10, a resistor R13, a resistor R14 and a negative temperature characteristic (NTC) thermistor R12, and a 2.5V signal source. The second pin (i.e. the inverting input end) of the operational amplifier U1-A is represented by an inverting input signal Vu2: Vu2=2.5*R14/(R13+R14), and the third pin (i.e. the non-inverting input end) of the operational amplifier U1-A is a non-inverting input signal, represented by Vu3.

The NTC thermistor R12 has a large resistance at a normal temperature or a low temperature, and Vu2 is larger than Vu3. And that output of the operational amplifier U1-A is low level 0V. The base signal of the triode Q1 is 0V, the triode Q1 is not conductive, and the output is full power. Vu3=2.5*R11 (R11+R12).

And when that temperature of the drive power supply rise, the resistance value of the thermistor R12 becomes small. From Vu3=2.5*R11 (R11+R12), when the resistance of the thermistor R12 becomes small, the value of Vu3 becomes large. When the voltage value of Vu3 is higher than Vu2. The first pin (i.e. the output end) of the operational amplifier U1-A outputs a high level, which is denoted by Vu1. The base signal of triode Q1 is divided by resistor R1 and resistor R2. At this time, the triode Q1 is turned on, and the resistor R3 and the resistor R4 are connected in parallel. And the sixth pin (i.e. the inverting input) of the operational amplifier U1-B is the current sense signal ISENCE. Vu5=2.5*R3//R4/(R3//R4+R5) once triode Q1 turn on operational amplifier U1-B pin 5, Vu5=2.5*R4/(R4+R5) when triode Q1 does not turn on. After setting their values, the signal of the fifth pin (non-inverting input end) becomes half when the triode Q1 turns on, that is, the ISENCE becomes half. The current becomes half. And that seventh pin of the operational amplify U1-B is connected with a feedback loop.

Because the power becomes half, the temperature of the driving power supply decreases after a period of time, and the resistance value of the thermistor R12 becomes large. Vu3=(2.5*(R11+R12)+Vu1/(R10+R11))*R11, since the signal of Vu1 introduces Vu1/(R10+R11)*R11. For Vu3 to be lower than Vu2, the value of 2.5*(R11+R12) must be smaller. That is, the resistance value of the thermistor R12 must be larger, that is, the driving temperature is required to be lower to form a return difference.

The application uses a pure analog circuit of the operational amplifier and the sensor, has the advantages of low cost, low cost, stable performance, little environmental influence and high precision, and can automatically reduce the output power to protect the LED driving power supply when the temperature is too high.

The above embodiments are only for illustrating the technical conception and characteristics of the application, aiming at enabling people familiar with the technology to understand the contents of the application and implement according to the contents, and cannot limit the protection scope of the application. All equivalent changes and modifications made in accordance with the scope of the claims of the application shall fall within the scope covered by the claims of the application.

What is claimed is:

1. An over-temperature protection circuit of a light emitting diode (LED) driving power supply, comprising: a temperature detection circuit (100) for sensing a temperature change of the LED driving power supply;
   a switch control circuit (200) connected to the output end of the temperature detection circuit (100) and controlling an on-off of a transistor in the switch control circuit according to the output signal of the temperature detection circuit (100);
   a shunt circuit (300) connected to an output end of the switch control circuit (200) and shunting current when the switch control circuit (200) is in an on state;
   a current detection circuit (400) connected to an output end of the shunt circuit (300) and changing a current detection signal according to an output current of the shunt circuit (300); the output end of the current detection circuit (400) is connected with a feedback loop (500).

2. The over-temperature protection circuit of a light emitting diode (LED) driving power supply according to claim 1, wherein the temperature detection circuit (100) comprises a first operational amplifier (U1-A), a thermistor (R12), a signal source, and a peripheral circuit;
   a non-inverting input end of the first operational amplifier (U1-A) is connected with the signal source through the thermistor (R12), and an inverting input end of the first operational amplifier (U1-A) is connected with the signal source; and the first operational amplifier (U1-A) is connected with the peripheral circuit.

3. The over-temperature protection circuit of a light emitting diode (LED) driving power supply according to claim 2, wherein the peripheral circuit comprises a first resistor (R10), a second resistor (R11), a third resistor (R13), and a fourth resistor (R14);
   the non-inverting input end of the first operational amplifier (U1-A) is connected with the output end of the first operational amplifier (U1-A) through the first resistor (R10), the non-inverting input end of the operational amplifier (U1-A) is connected with the ground through the second resistor (R11), and the inverting input end of the operational amplifier (U1-A) is connected with the signal source through the third resistor (R13);
   the inverting input end of the first operational amplifier (U1-A) is connected with the switch control circuit (200) through the fourth resistor (R14), and the output end of the first operational amplifier (U1-A) is connected with the switch control circuit (200).

4. The over-temperature protection circuit of a light emitting diode (LED) driving power supply according to claim 3, wherein the switch control circuit (200) comprises a triode (Q1), a fifth resistor (R1), and a sixth resistor (R2);
   a base electrode of the triode (Q1) is connected with an output end of the first operational amplifier (U1-A) through the fifth resistor (R1), a base electrode of the triode (Q1) is connected with an emitter electrode of the triode (Q1) through the sixth resistor (R2), and an emitter electrode of the triode (Q1) is connected with the inverting input end of the first operational amplifier (U1-A) through the fourth resistor (R14); the emitter of the triode (Q1) is grounded;

the collector of the triode (Q1) and the emitter of the triode (Q1) are connected with the shunt circuit (300).

5. The over-temperature protection circuit of a light emitting diode (LED) driving power supply according to claim 4, wherein the shunt circuit (300) comprises an eighth resistor (R3) and a ninth resistor (R4);
the collector of the triode (Q1) is connected with the current detection circuit (400) through the eighth resistor (R3), and the emitter of the triode (Q1) is connected with the current detection circuit (400) through the ninth resistor (R4).

6. The over-temperature protection circuit of a light emitting diode (LED) driving power supply according to claim 5, wherein the current detection circuit (400) comprises a second operational amplifier (U1-B);
the non-inverting input end of the second operational amplifier (U1-B) is connected with the collector of the triode (Q1) through the eighth resistor (R3), and the non-inverting input end of the second operational amplifier (U1-B) is connected with the emitter of the triode (Q1) through the ninth resistor (R4);
the inverting input end of the second operational amplifier (U1-B) is connected with the current detection signal output end; the output end of the second operational amplifier (U1-B) is connected with the feedback loop (500).

7. The over-temperature protection circuit of a light emitting diode (LED) driving power supply according to claim 6, wherein the current detection circuit (400) further comprises a tenth resistor (R5);
the non-inverting input end of the second operational amplifier (U1-B) is connected with the signal source through the tenth resistor (R5).

8. The over-temperature protection circuit of a light emitting diode (LED) driving power supply according to claim 7, wherein the signal source is a 2.5V signal source.

9. The over-temperature protection circuit of a light emitting diode (LED) driving power supply according to claim 7, wherein the thermistor (R12) is a negative temperature coefficient thermistor.

10. The over-temperature protection circuit of a light emitting diode (LED) driving power supply according to claim 6, wherein the current detection circuit (400) further comprises an eleventh resistor (R7);
the output end of the second operational amplifier (U1-B) is connected to the feedback loop (500) through the eleventh resistor (R7).

11. The over-temperature protection circuit of a light emitting diode (LED) driving power supply according to claim 6, wherein the signal source is a 2.5V signal source.

12. The over-temperature protection circuit of a light emitting diode (LED) driving power supply according to claim 6, wherein the thermistor (R12) is a negative temperature coefficient thermistor.

13. The over-temperature protection circuit of a light emitting diode (LED) driving power supply according to claim 5, wherein the signal source is a 2.5V signal source.

14. The over-temperature protection circuit of a light emitting diode (LED) driving power supply according to claim 5, wherein the thermistor (R12) is a negative temperature coefficient thermistor.

15. The over-temperature protection circuit of a light emitting diode (LED) driving power supply according to claim 4, wherein the signal source is a 2.5V signal source.

16. The over-temperature protection circuit of a light emitting diode (LED) driving power supply according to claim 4, wherein the thermistor (R12) is a negative temperature coefficient thermistor.

17. The over-temperature protection circuit of a light emitting diode (LED) driving power supply according to claim 3, wherein the signal source is a 2.5V signal source.

18. The over-temperature protection circuit of a light emitting diode (LED) driving power supply according to claim 3, wherein the thermistor (R12) is a negative temperature coefficient thermistor.

19. The over-temperature protection circuit of a light emitting diode (LED) driving power supply according to claim 2, wherein the signal source is a 2.5V signal source.

20. The over-temperature protection circuit of a light emitting diode (LED) driving power supply according to claim 2, wherein the thermistor (R12) is a negative temperature coefficient thermistor.

* * * * *